US006768237B1

(12) United States Patent  
Schroedl

(10) Patent No.: US 6,768,237 B1  
(45) Date of Patent: Jul. 27, 2004

(54) ELECTRIC MOTOR

(76) Inventor: Manfred Schroedl, Untere Hauptstrasse 9, A-7223 Sieggraben (AT)

( * ) Notice: Subject to any disclaimer, the term of this patent is extended or adjusted under 35 U.S.C. 154(b) by 0 days.

(21) Appl. No.: 09/926,796

(22) PCT Filed: Jun. 21, 2000

(86) PCT No.: PCT/AT00/00167

§ 371 (c)(1),
(2), (4) Date: Dec. 20, 2001

(87) PCT Pub. No.: WO01/01550

PCT Pub. Date: Jan. 4, 2001

(30)  Foreign Application Priority Data

Jun. 21, 1999 (AT) .............................................. 1081/99
Dec. 15, 1999 (AT) .............................................. 2115/99

(51) Int. Cl.$^7$ ............................................. H02K 16/00
(52) U.S. Cl. ...................... 310/114; 310/112; 310/266
(58) Field of Search ................................ 310/112, 113, 310/114, 266

(56)        References Cited

U.S. PATENT DOCUMENTS

| 1,620,747 | A | * | 3/1927 | Allison ......................... 290/47 |
| 1,848,091 | A | * | 3/1932 | Winther ..................... 192/48.2 |
| 2,064,583 | A | * | 12/1936 | Wolkoff ..................... 310/40 R |
| 3,683,249 | A | * | 8/1972 | Fukuo et al. ............... 318/730 |
| 4,117,390 | A | | 9/1978 | Iwata et al. ................... 322/90 |
| 4,375,047 | A | * | 2/1983 | Nelson et al. ................ 318/48 |
| 5,262,693 | A | * | 11/1993 | Holka ......................... 310/121 |
| 5,289,072 | A | * | 2/1994 | Lange ........................ 310/266 |
| 5,412,268 | A | | 5/1995 | Arnaud et al. ............ 370/67 R |
| 5,744,895 | A | | 4/1998 | Seguchi et al. ............. 370/266 |
| 5,793,136 | A | * | 8/1998 | Redzic ........................ 310/114 |
| 5,814,913 | A | * | 9/1998 | Ojima et al. ................. 310/112 |
| 5,912,516 | A | * | 6/1999 | Atkinson et al. .......... 310/67 R |
| 5,917,248 | A | | 6/1999 | Seguchi et al. ............... 290/31 |
| 5,934,395 | A | | 8/1999 | Koide et al. ............... 180/85.2 |
| 5,973,460 | A | | 10/1999 | Taga et al. .................. 318/139 |
| 6,133,659 | A | * | 10/2000 | Rao ............................. 310/89 |
| 6,211,597 | B1 | * | 4/2001 | Nakano ...................... 310/266 |
| 6,297,575 | B1 | * | 10/2001 | Yang ........................... 310/266 |
| 6,373,160 | B1 | * | 4/2002 | Schrodl ...................... 310/114 |

FOREIGN PATENT DOCUMENTS

| DE | 2814884  | 10/1979 |
| EP | 0320415  | 6/1989  |
| EP | 0725474  | 8/1996  |
| EP | 0769403  | 4/1997  |
| EP | 0791495  | 8/1997  |
| EP | 0800951  | 10/1997 |
| JP | 57116578 | 7/1982  |
| JP | 9-74701  | 3/1997  |
| WO | 95/34117 | 12/1995 |

OTHER PUBLICATIONS

English Language Abstract of JP 57–116578, Jul. 20, 1982.
English Language Abstract of JP 9–74701, Mar. 18, 1997.

* cited by examiner

Primary Examiner—Dang Le
(74) Attorney, Agent, or Firm—Greenblum & Bernstein, P.L.C.

(57)          ABSTRACT

Electric motor system including at least a first electric motor that includes a first rotor. The first rotor is mechanically coupled to an engine. At least a second electric motor includes a second rotor. The second rotor is mechanically coupled to a mechanical aggregate. An electronic power system is also included. Each of the first electric motor and the second electrical motor is electrically coupled to one another via the electronic power system in order to exchange electric power at a freely selectable voltage level.

69 Claims, 6 Drawing Sheets

Fig. 4
Fig. 5
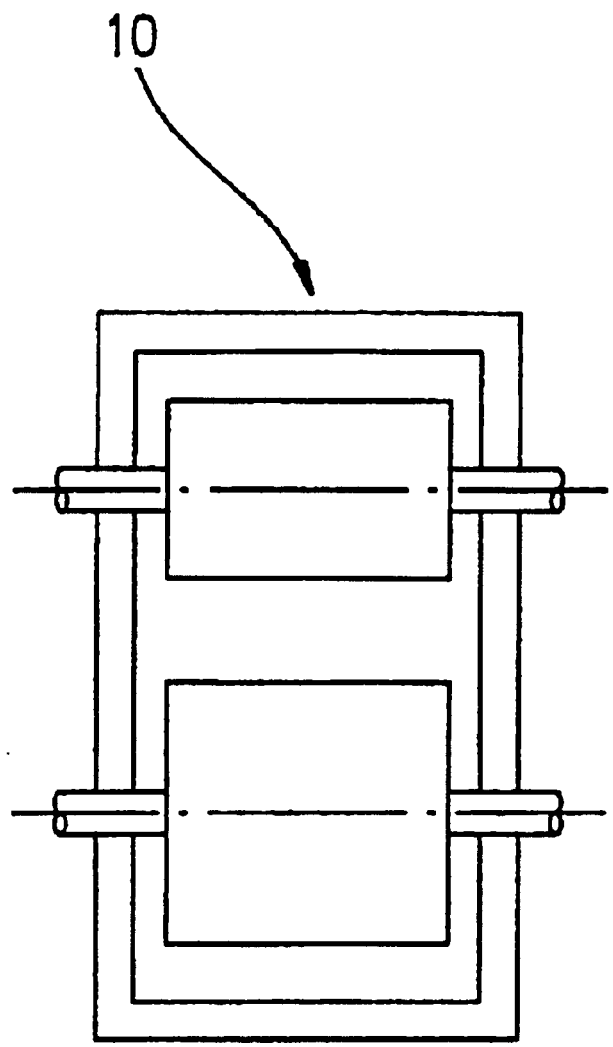
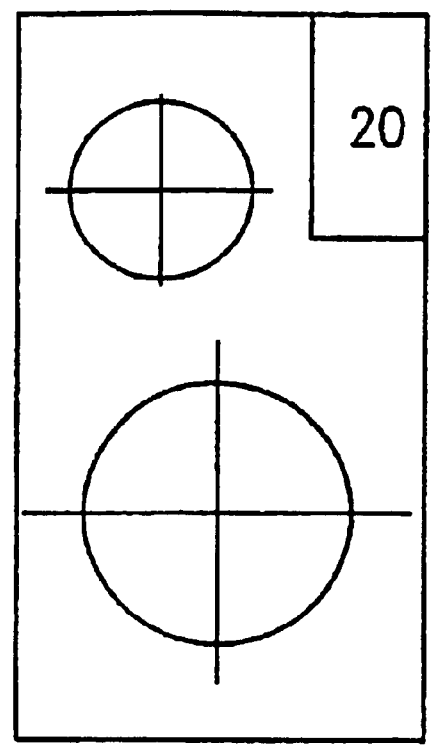

US 6,768,237 B1

ELECTRIC MOTOR

CROSS-REFERENCE TO RELATED APPLICATIONS

The present application is a National Stage Application of International Application No. PCT/AT00/00167, filed Jun. 21, 2000. Further, the present application claims priority under 35 U.S.C. § 119 of Austrian Patent Application Nos. A 1081/99 filed on Jun. 21, 1999, and A 2115/99 filed on Dec. 15, 1999.

BACKGROUND OF THE INVENTION

1. Field of the Invention

The invention relates to an electric motor system, preferably of the three-phase current design.

2. Discussion of Background Information

Electric motors are being used more and more in automotive engineering. Systems that handle the power exchange on the machine voltage level are known, such as the ISAD system (integrated starter-alternator-damper system).

Furthermore, electrically operated turbochargers are known, in which the power exchange also takes place on the machine voltage level. Thereby, the turbocharger capacity is derived entirely from the machine's mains.

SUMMARY OF THE INVENTION

The aim of this invention is to create an electric motor system that can be used especially in automotive engineering environment, and that provides sufficient electric power or different levels of voltage for the supply of two different mains, especially for a turbocharger.

The electric motor system according to this invention is characterized by the fact that a first electric motor is provided, which is mechanically connected via the rotor thereof to a rotating shaft of an engine, especially of an internal combustion engine, that in addition, at least one second electric motor is provided, that the second electric motor is mechanically coupled via the rotor thereof to a rotating part of a mechanical aggregate, especially to a turbo-engine, and that the first electric motor is electrically coupled to at least the second electric motor in order to exchange electric power at a freely selectable voltage level. With this invention, it is possible for the first time to create a separate, autarkic, internal electric circuit or component that is independent from the voltage level of the machine's mains. With this, the motor according to the invention and the electronic power circuits can be designed with optimal operating voltages. It is also known that it is usually more advantageous to transport electric power at higher voltages than those currently common in the machine's mains.

This internal electrical circuit or component is connected with the first motor through electronic power components such as diodes and transistors and via circuits in accordance with the state of the art, in order to design the internal electrical component in terms of its electric ratios, such as voltages and currents and their time curves.

The first motor can supply and discharge mechanical torque via the combustion engine, so that the first motor can work as a generator when power is consumed, and it discharges this energy to the internal electrical part in the form of electric power. If the first motor draws electric power from the internal electric part, it works as a motor and can use this torque e.g. to start the combustion engine or to support or optimize its operation.

In a special feature of the invention, the first electric motor is mechanically connected via the rotor thereof to a rotating shaft or to the shaft of a combustion engine mechanically connected to the rotating shaft. As a result, the mechanical torque between the first electric motor and the combustion engine can easily be exchanged.

In accordance with one embodiment of the invention, the first electric motor is mechanically connected to the combustion engine via a gearbox. This design solution also improves the torque at low revs in an electrically driven turbocharger.

In accordance with another embodiment of the invention, the first electric motor is a part of the combustion engine, e.g. the rotor in the first electric motor is integrated in the flywheel of the combustion engine. The advantage of this design solution lies mainly in the fact that the entire arrangement can be produced in a relatively compact manner.

In accordance with a special feature of the invention, the first electric motor is connected to at least one external electric circuit, preferably a machine's mains. This second electric coupling is connected to the machine's mains via an electronic voltage adjustment circuit in accordance with the state of the art. As a result, power can be exchanged between the internal electric part and the machine's mains. Thus, the first electric motor in accordance with the invention can be operated as a starter in one power direction and as a machine's mains charging device in the other direction.

In accordance with a further embodiment of the invention, the first and second electric motors are mounted in a casing. With this embodiment, it is possible to produce an electric drive system that can be manufactured and used economically. The advantage of this invention is the fact that, unlike the known electromagnetic drives or purely mechanical drives, such as gears in which two different, usually independent speeds are required, major parts such as the casing elements, parts of the controls, can be spared. In addition, the well-known local EMC problems in the casing can be solved and do not penetrate into the surroundings.

In accordance with a further embodiment of the invention, the first and/or second electric motor(s) is/are designed as asynchronous, synchronous or reluctance motor. Thus, the optimal motor can be chosen for each individual application.

In accordance with a further feature of the invention, the first and second electric motors have rotors with the same axis of rotation. Especially in automotive engineering it is an advantage if there is only one axis of rotation for a mechanic-electric-mechanic coupling.

In accordance with a special embodiment of the invention, one of the two motors is designed as an inner rotor and the other motor as an outer rotor. This embodiment of the invention also allows a compact motor design.

In accordance with a further feature of the invention, the two electric motors have one mutual stator plate package. In this embodiment, a stator with at least one stator coil and at least two rotors can be provided in one casing. The rotors are mechanically separated, and each rotor has electromagnetic interaction with the electromagnetically active stator, whereby the rotor speeds may be the same or different.

In accordance with a further embodiment of the invention, the components for electric power exchange between the electric motors and/or an external electric circuit are mounted in the casing of at least one electric motor. This embodiment serves primarily to create a compact electric motor for automotive engineering environment.

In a further embodiment of the invention, the casing of at least one electric motor has a liquid cooling system. As a result, the frictional heat of the coils and also of the electronic power elements, which may occur due to the known problems with the high currents in the motor, can be discharged optimally.

In accordance with another feature of the invention, a mains connection with direct, alternating or three-phase current can be derived from the electric circuit connecting the two electric motors. In this embodiment, an additional three-phase, alternating or direct current network can be provided by the internal electric circuit. For example, a strong 230 V supply or 3×400 V supply can be decoupled, whereby the frequency can be specified either internally or externally. Thus, the machine's mains and the aggregates connected to it are connected to this supply in terms of power via the internal electric circuit.

As a result, the combustion engine can be started from the power supply without requiring the machine's mains, for example, or vice versa the combustion engine can support or charge an existing supply. It is also possible to charge the machine's mains battery from the supply in a simple manner.

In accordance with a special feature of the invention, the stator of at least one electric motor has at least two winding systems, preferably separated galvanically within the motor, which are mechanically coupled with the motor's main current. With this embodiment of the invention, it is possible to create two autarkic electric circuits with independent voltage levels. Another advantage of this invention is the fact that electromagnetic or EMC interference from switching in one winding system can be suppressed in another winding system. Moreover, the individual winding systems can work advantageously at different voltage levels, especially galvanically separate ones. Specific galvanic separation and/or a transformer for voltage adjustment between the two electric circuits involved is no longer required.

In accordance with a special feature of the invention, at least two winding systems are connected via separate electronic power switches with the relevant, preferably galvanically separated power circuits. This offers the advantage that for example a mains supply, especially a machine's mains can be operated and controlled separately from another mains supply.

In accordance with a further embodiment of the invention, at least one winding system is connected via a rectifier bridge with a direct current or battery-fed mains, preferably a machine's mains, for power exchange in one direction. With this embodiment, more economic, or even cheaper electronic power components can be used for charging.

In accordance with a further feature of the invention, at least one winding system is connected via a transistor bridge with a direct current or battery-fed mains, preferably a machine's mains, for power exchange in both directions. This offers the advantage that a separate starter is not required, or power is drawn from one mains, preferably the machine's mains, and fed into the other mains.

In accordance with a special feature of the invention, the motor with at least one of the winding systems can be operated as a generator for charging the connected machine's mains, and also as a motor, preferably as a starter for a mechanically coupled combustion engine. This embodiment also offers the advantage that the starter, but also the generator can be eliminated in the design.

In accordance with a further embodiment of the design, galvanically separated electric power exchange via the at least two winding systems is possible between the electric circuits connected to the winding systems. This allows the advantageous separation of the machine's mains from the second mains, which may well have a higher voltage.

In accordance with a further embodiment of the invention, the winding systems controlled via the electronically controlled switches take over the control of the electric parameters from winding systems coupled via non-controllable electronic power elements, preferably diodes. Thereby it is advantageous that for the control of the charging process no separate controllable elements are required and instead the controllable elements of the second mains can be used.

In accordance with a further feature of the invention, each winding system—galvanically independent from the other winding system—is connected with electromechanical function groups on generally different voltage levels. Thus, the electromechanical function groups, e.g. an electrically operated oil pump or water pump, or an electromagnetically operated valve control for in- and output valves or motor valves, or an electrically operated ventilator can be operated independent of the power limitation of the direct current or the battery at an advantageous voltage and/or current level.

In accordance with a special embodiment of the invention, an electromagnetic power exchange between the winding systems independent of rotor rotation according to the transformer principle is possible through close magnetic coupling of the winding systems. This offers the advantage that even when the rotor is stationary a power transfer to the relatively closely coupled other winding system is possible via a time-variable voltage through suitable electronic actuators on one winding system.

In accordance with a further feature of the invention, a slight electromagnetic influence on the winding systems results from weak magnetic coupling of the winding systems. This offers the advantage that electromagnetic interference due to switching processes in one winding system hardly takes effect in the other winding system.

In accordance with a further embodiment of the invention, a freely selectable electromagnetic power exchange between the winding systems and the rotor shaft can be achieved by controlling the electromagnetic parameters, preferably the currents and flux linking, of at least one winding system. This embodiment offers the advantage that mechanical and electric energy is provided in accordance with the current, optimal strategy.

In accordance with a further embodiment of the invention, a first and second electric motor is mounted in a casing. With this embodiment, it is possible to produce an electric drive system that can be manufactured and used economically. The advantage of this invention is the fact that, unlike the known electromagnetic drives or purely mechanical drives, such as gears in which two different, usually independent speeds are required, major parts such as the casing elements, parts of the controls, can be spared. In addition, the well-known local EMC problems in the casing can be solved and do not penetrate into the surroundings.

In accordance with a further embodiment of the invention, the first and/or second electric motor(s) is/are designed as asynchronous, synchronous or reluctance motor. Thus, the optimal motor can be chosen for each individual application.

In accordance with a further feature of the invention, the first and second electric motors have rotors with the same axis of rotation. Especially in automotive engineering environments it is an advantage if there is only one axis of rotation for a mechanic-electric-mechanic coupling.

The invention also provides for an electric motor system comprising at least a first electric motor comprising a first rotor. The first rotor is mechanically coupled to an engine. At least a second electric motor comprises a second rotor. The second rotor is mechanically coupled to a mechanical aggregate. An electronic power system is included. Each of the first electric motor and the second electric motor is electrically coupled to one another via the electronic power system in order to exchange electric power at a freely selectable voltage level.

At least one of the first and second motors may be of a three-phase type. The first rotor may be mechanically coupled to the engine via at least one rotating shaft. The engine may comprise an internal combustion engine. The first rotor may be mechanically coupled to the internal combustion engine via at least one rotating shaft. The second rotor may be mechanically coupled to the aggregate via a rotating part. The aggregate may comprise at least one of a turbo-engine and a turbocharger. The aggregate may comprise at least one of a turbo-engine and a turbocharger. The electric motor system may further comprise a gearbox, wherein the first electric motor is mechanically connected to the engine via the gearbox. The first electric motor may be at least one of integrated with the engine and integrated with a flywheel of the engine. The engine may comprise a flywheel and wherein the first electric motor is structurally integrated with the flywheel. The first electric motor may be connected to at least one of at least one external electric circuit, and a machine's mains. The electric motor system may further comprise a casing, wherein each of the first and second motors are mounted in the casing. At least one of the first and second electric motors may be one of an asynchronous type motor, a synchronous type motor, and a reluctance type motor. An axis of the first rotor may be aligned with an axis of the second rotor, such that the first and second rotors of the first and second electric motors share a common axis of rotation. The first rotor may comprise one of an inner rotor and an outer rotor. The second rotor may comprise one of an inner rotor and an outer rotor. The first rotor may comprise an inner rotor and the second rotor may comprise an outer rotor.

The electric motor system may further comprise a mutual stator plate system. The mutual stator plate system may comprise at least one first stator and at least one second stator, the at least one first stator forming part of the first motor and the at least one second stator forming part of the second motor. Each of the first and second rotors may be rotatable with respect to the mutual stator plate system.

The electronic power system may comprise at least one of a component and an external electric circuit, which is mounted in a casing. The casing may contain at least one of the first and second motors. The electric motor system may further comprise a casing for housing at least one of the first and second motors, wherein the casing includes one of a cooling system and a liquid cooling system. The electronic power system may be capable of supplying to a mains connection at least one of a direct current, an alternating current, and a three-phase current.

Each of the first and second motors may comprise a stator, and wherein at least one of the stators includes at least two winding systems. The at least two winding systems may be galvanically separated from one another. The at least two winding systems may be coupled magnetically with a main flux of at least one of the first and second motors. The at least two winding systems may be connected to separate electronic power circuits. The separate electronic power circuits may be galvanically separated from one another. At least one of the at least two winding systems may be connected via a rectifier bridge to at least one of a direct current supply, a battery-fed mains, and a machine's mains, whereby power can be exchanged in one direction. At least one of the at least two winding systems may be connected via a transistor bridge to at least one of a direct current supply, a battery-fed mains, and a machine's mains, whereby power can be exchanged in both directions.

At least one of the first and second motors may be operated as a generator and as a motor. The generator may be configured to charge a connected machine's mains.

A least one of the first and second motors can be operated as a generator and as a starter. The first motor may function as the generator and as the starter, and wherein the starter is mechanically coupled to the engine. Each of the at least two winding systems may be configured to allow a galvanically separable electric power exchange to occur between circuits connected to the winding systems. The at least two winding systems may be controllable via electronically controlled switches. The electronically controlled switches may be configured to take over control of electric parameters from the at least two winding systems. The at least two winding systems may be coupled to non-controllable electronic power elements. The non-controllable electronic power elements may comprise diodes.

Each of the at least two winding systems may be galvanically independent of the other winding system and may be connected with electromechanical function groups on generally different voltage levels. The at least two winding systems may be closely magnetically coupled such that an electromagnetic power exchange occurs between the at least winding systems independent of rotor rotation according to a transformer principle. The at least two winding systems may be weakly magnetically coupled such that a slight electromagnetic influence, results on the at least two winding systems. A freely selectable electromagnetic power exchange may occur between the at least two winding systems and a rotor shaft connected to one of the first and second rotors. The freely selectable electromagnetic power exchange may be adapted to occur by controlling electromagnetic parameters. The electromagnetic parameters may comprise at least one of currents and flux linking of at least one of the at least two winding systems. Each of the first and second electric motors may be mounted in a casing. Each of the first and second electric motors may comprise one of an asynchronous motor, a synchronous motor and a reluctance motor. Each of the first and second rotors may rotate with respect to a common axis.

The invention also provides for an electric motor system comprising at least a first electric motor comprising a first rotor and a first stator. The first rotor is mechanically coupled to an engine. At least a second electric motor comprises a second rotor and a second stator. The second rotor is mechanically coupled to a mechanical aggregate. The first stator is coupled to the second stator. An electronic power system is included. Each of the first electric motor and the second electrical motor is electrically coupled to one another via the electronic power system in order to exchange electric power at a freely selectable voltage level.

The invention still further provides for an electric motor system comprising a casing and at least a first electric motor comprising a first rotor and a first stator system. The first rotor is mechanically coupled to an engine. At least a second electric motor comprises a second rotor and a second stator system. The second rotor is mechanically coupled to a mechanical aggregate. The first stator is coupled to the second stator. Each of the first stator system and the second stator system is coupled to the casing. An electronic power system is provided. Each of the first rotor and the second rotor rotate about a common axis and each of the first electric motor and the second electrical motor is electrically coupled to one another via the electronic power system in order to exchange electric power at a freely selectable voltage level.

BRIEF DESCRIPTION OF THE DRAWINGS

The invention is explained in more detail based on the design examples illustrated in the figures.

FIGS. 4 and 5 show an embodiment of the electric motor;

DETAILED DESCRIPTION OF THE INVENTION

By way of introduction, it is noted that in the described embodiment the same parts and the same states are allocated the same reference numbers and the same component names, whereby the disclosures contained throughout the description can be applied by analogy to the same parts and the same states with the same reference numbers or same component names. Furthermore, position details given in the description, e.g. top, bottom, side, etc., relate to the figure being described and illustrated at the time and with a change of position should be transferred accordingly to the new position.

Moreover, individual features or combinations of features from the different embodiments illustrated can represent independent solutions according to the invention in themselves. The relevant tasks and solutions according to the invention are shown in the detailed descriptions of these figures.

Figure 1:
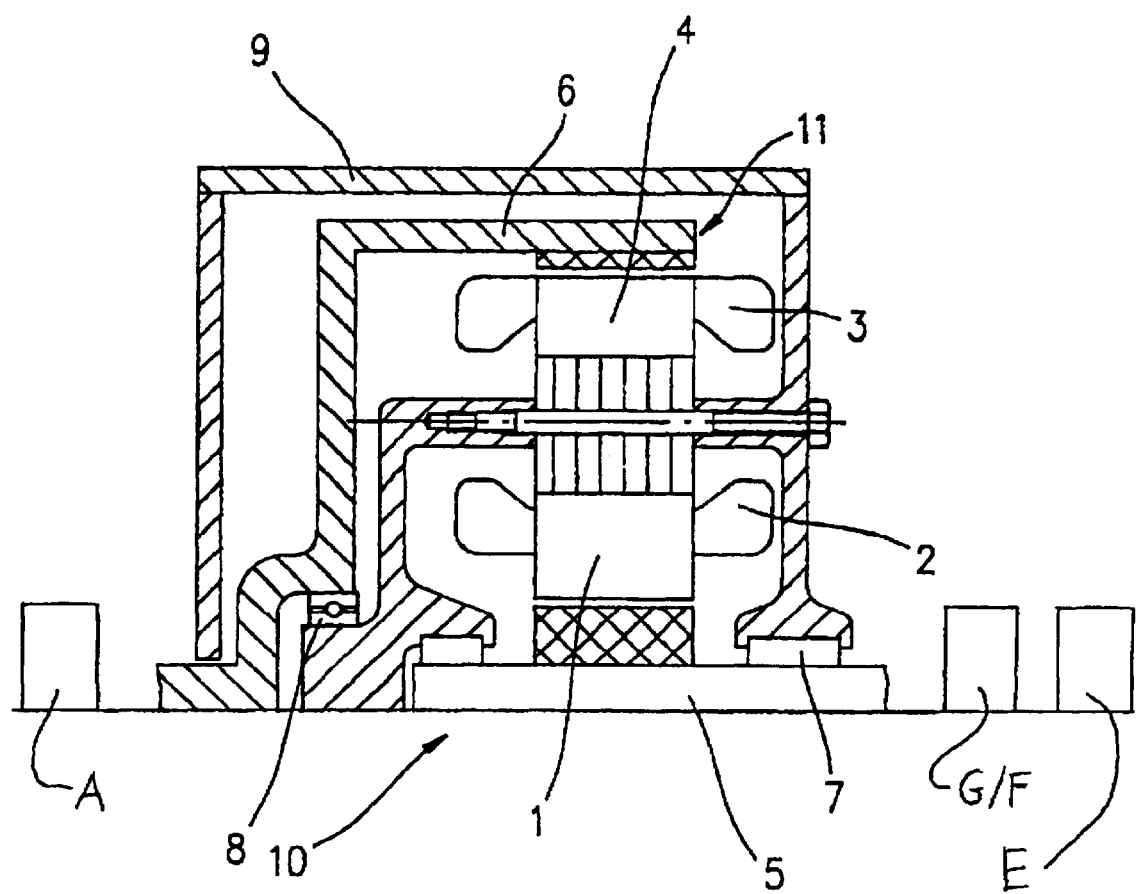
FIG. 1 shows an electric motor with rotors with the same axis of rotation.

Basically, various design variations for such electric motors are possible. FIG. 1 shows a first electric motor 10 with one stator 1, which has one winding 2. In the cylindrical motor array, one winding 2 is on the inside of the stator 1 or the stator bore, and can be designed as a groove or air-gap winding. The second electric motor 11 has one winding 3 on the outside of the stator 4 as a groove or air-gap winding, whereby winding 2 interacts with a rotor 5 designed as an inner rotor, and winding 3 interacts with a rotor 6 designed as an outer rotor. The rotors 5, 6 can be designed with permanent magnet excitation, as cage rotors, with a reluctance structure, etc. The two rotors 5, 6 are mounted mechanically on one suitable bearing 7, 8 each according to the state of the art in the casing 9.

As already mentioned, the main application for such an electric motor 10, 11 is in the field of automotive engineering, whereby it can fulfil several functions. The first electric motor 10 is mechanically coupled with the combustion engine E, e.g. via a gearbox G with a rotating shaft, or the first motor 10 with its rotor 5 is located directly on an existing element of the combustion engine E, such as e.g. the gear flywheel F or an existing drive wheel, or it is structurally integrated with this component. This first motor 10 can thus supply and discharge mechanical torque with the combustion engine E, so that the first motor 10 can work as a generator when power is consumed, and it discharges this energy to the internal electrical part in the form of electric power. If the first motor 10 draws electric power from the internal electric part, it works as a motor and can use this torque to start the combustion engine or to support or optimize its operation.

Figure 2:
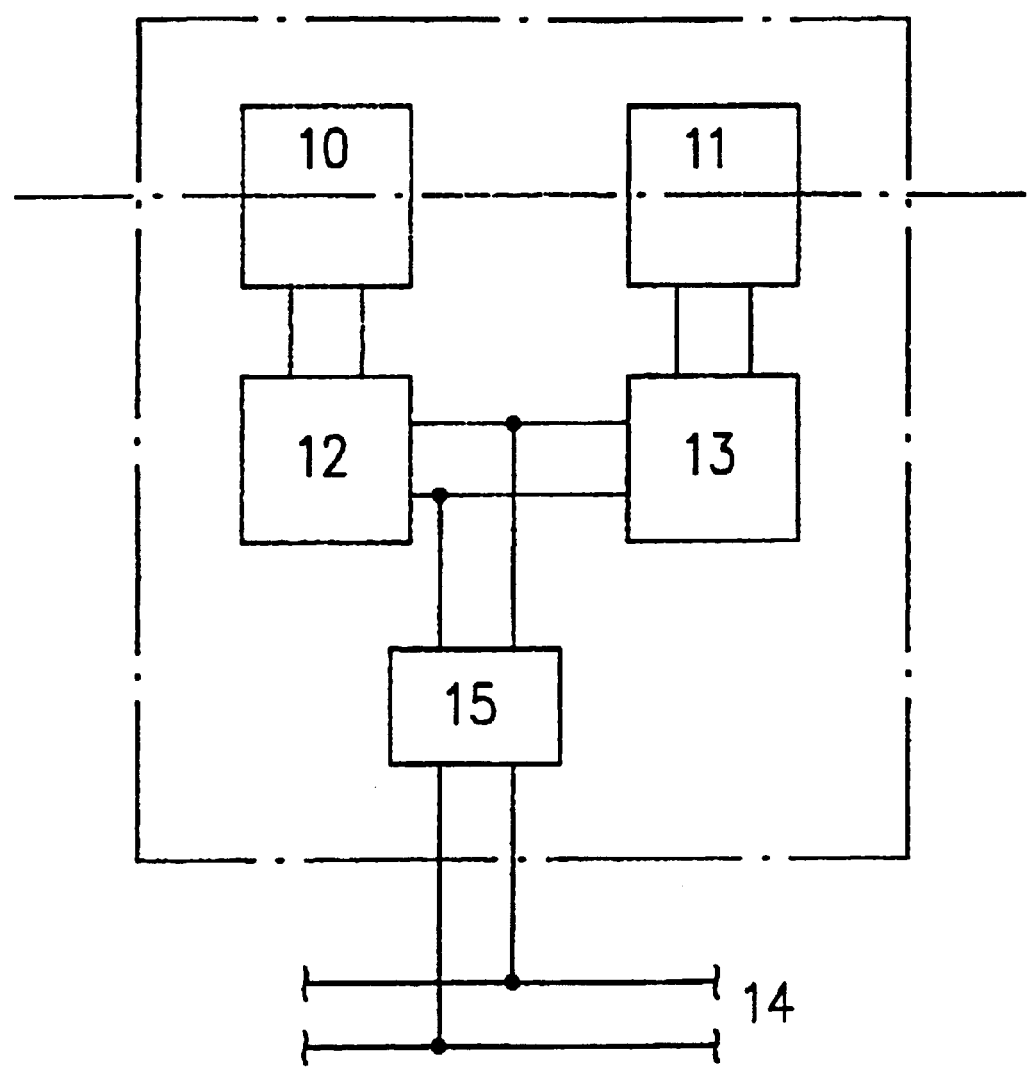
FIG. 2 shows a basic sketch of the electrical circuit of the motor.

In accordance with FIG. 2, the first electric motor 10 and the second electric motor 11 are each connected to a control or power component 12, 13. For the exchange of electric power at freely selectable voltage levels, the two control and power components 12, 13, which also perform the electronic power conversion, are connected to each other. This internal electric circuit is connected with the first motor through electronic power components, such as diodes and transistors and via circuits in accordance with the state of the art, in order to design the internal electrical component in terms of its electric parameters, such as voltages and currents and their time curves. An important feature of this internal electric circuit and thus of the voltage level of the first motor is the independence of the voltage level from an external electric circuit, the so-called machine's mains 14. Thus, the motors in accordance with the invention and the electronic power circuits can be designed with optimal operating voltages. It is known that it is usually more advantageous to transport electric power at higher voltages than those currently common in the machine's mains.

This external machine's mains 14 is connected to the internal electric circuit via an additional control or power component 15.

This also offers a major advantage of this arrangement, since the mechanical power exchange between the combustion engine and one or more additional aggregates A, such as turbochargers, pumps, ventilators, compressors, etc., can be provided without using the machine's mains. In addition to the optimal voltage level, the arrangement also offers significantly improved EMC properties, since with simple measures in accordance with the state of the art the EMV interference is not able to penetrate the machine's mains 14 or generally the environment of the aggregate and only has to be controlled within the aggregate. Moreover, with this arrangement it is possible to transfer significantly more power for the supply of secondary aggregates independent of the speed than is possible via the machine's mains.

From this internal electric component, the voltage of which can be adjusted to optimal operation of the array constantly, provided the electronic power elements allow this, one or preferably two or more electric power exchange couplings branch off.

The first electric coupling goes via the electronic power elements to the electric connection of the second motor 11, which can transform electric power at a speed level basically independent of the first motor 10 into mechanical power. In the preferred variant of this array, this mechanical power serves to operate a turbo engine, such as a turbocharger, thus making the advantage of turbo engine operation independent of the combustion engine speed possible. Compared with the known electrically operated turbochargers, this array also offers the major advantage that the turbocharger power is not necessarily drawn entirely from the machine's mains 14, but is exchanged completely or partly with the combustion engine via the first motor 10. This means that there is considerably less stress on the machine's mains, and it allows a power exchange on a more favourable electric voltage level, whereby the wiring and the electronic power components can be designed more favourably. The power exchange can be bi-directional. In the same way, further electric motors as a part of the invention can be coupled to the internal electric part for the operation of additional aggregates, such as e.g. water pumps, ventilators, compressors, etc.

The second electric coupling is connected to the machine's mains via an electronic voltage adjustment circuit in accordance with the state of the art As a result, power can be exchanged between the internal electric part and the machine's mains 14. Thus, the first electric motor 10 can be operated as a starter in one power direction and as a machine's mains charging device in the other direction. The major advantage of this operating mode lies in the fact that a separate starter and a separate generator are not required, since these functions are provided by the array. A major advantage over known arrays lies in the fact that the starter can now be designed and operated as a motor with optimal voltage level, so that the known problems with high currents in the motor and also in the electronic power elements connected to the motor phases are avoided.

Furthermore, the second motor 11 can also be operated via the machine's mains 14 independent of the combustion engine, e.g. even when it is switched off. This means that the turbocharger can, for example, be started while the combustion engine is off, thus allowing a better starting process. Compared with known solutions, this solution offers the advantage that the second motor and the power electronics on the motor side can be designed and operated at an optimal voltage level.

In a further embodiment, an additional three-phase, alternating or direct current network can be provided by the internal electric circuit. For example, a strong 230 V supply or 3×400 V supply can be decoupled, whereby the frequency can be specified either internally or externally. Thus, the machine's mains 14 and the aggregates connected to it are connected to this supply in terms of power via the internal electric circuit.

Figure 3:
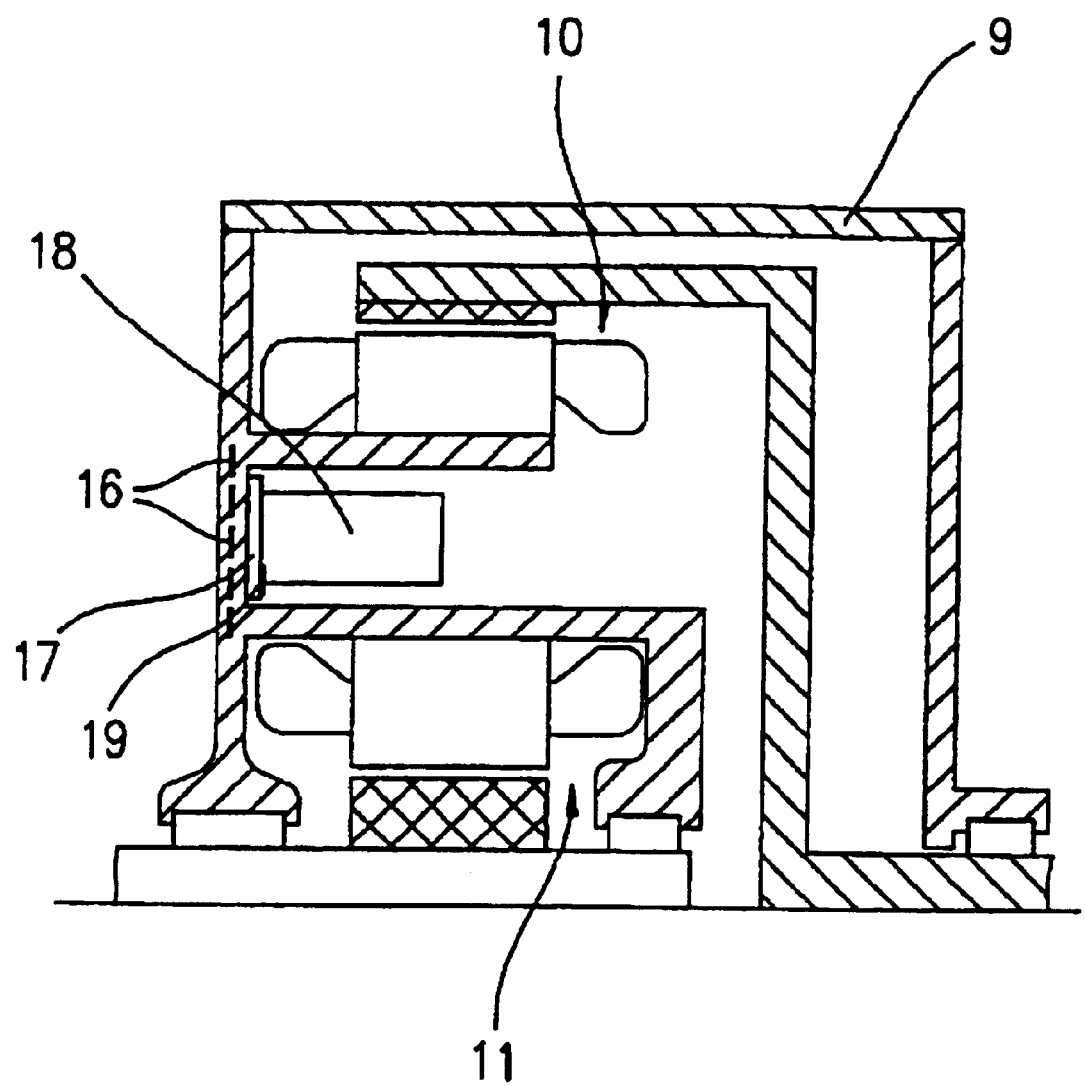
FIG. 3 shows the electric motor with the electronic elements.

As a result, the combustion engine can be started from the power supply without requiring the machine's mains, for example, or vice versa the combustion engine can support or charge an existing supply. It is also possible to charge the machine's mains battery from the supply in a simple manner. In accordance with FIG. 3, the first electric motor 10 and the second electric motor 11 are mounted in the casing 9.

For cooling, the casing 9 can have cooling channels 16. In the area of these well-cooled casing components, an electronic power and control circuit including electric, magnetic and mechanical components, such as semiconductors 19, capacitors 18, throttles, relays or the like and any required carrier materials 17 can be arranged in order to realize the functions in accordance with the elements, such as the control and power component 12, 13, 15 in FIG. 2, advantageously.

A further embodiment of the electric motor is shown in FIGS. 4 and 5. Thereby, the two electric motors 10, 11 can be arranged on top of each other, and the rotor output can be provided on the left and/or right of each motor. Thereby, the electronic component 20 can also be integrated in this motor casing.

Figure 6:
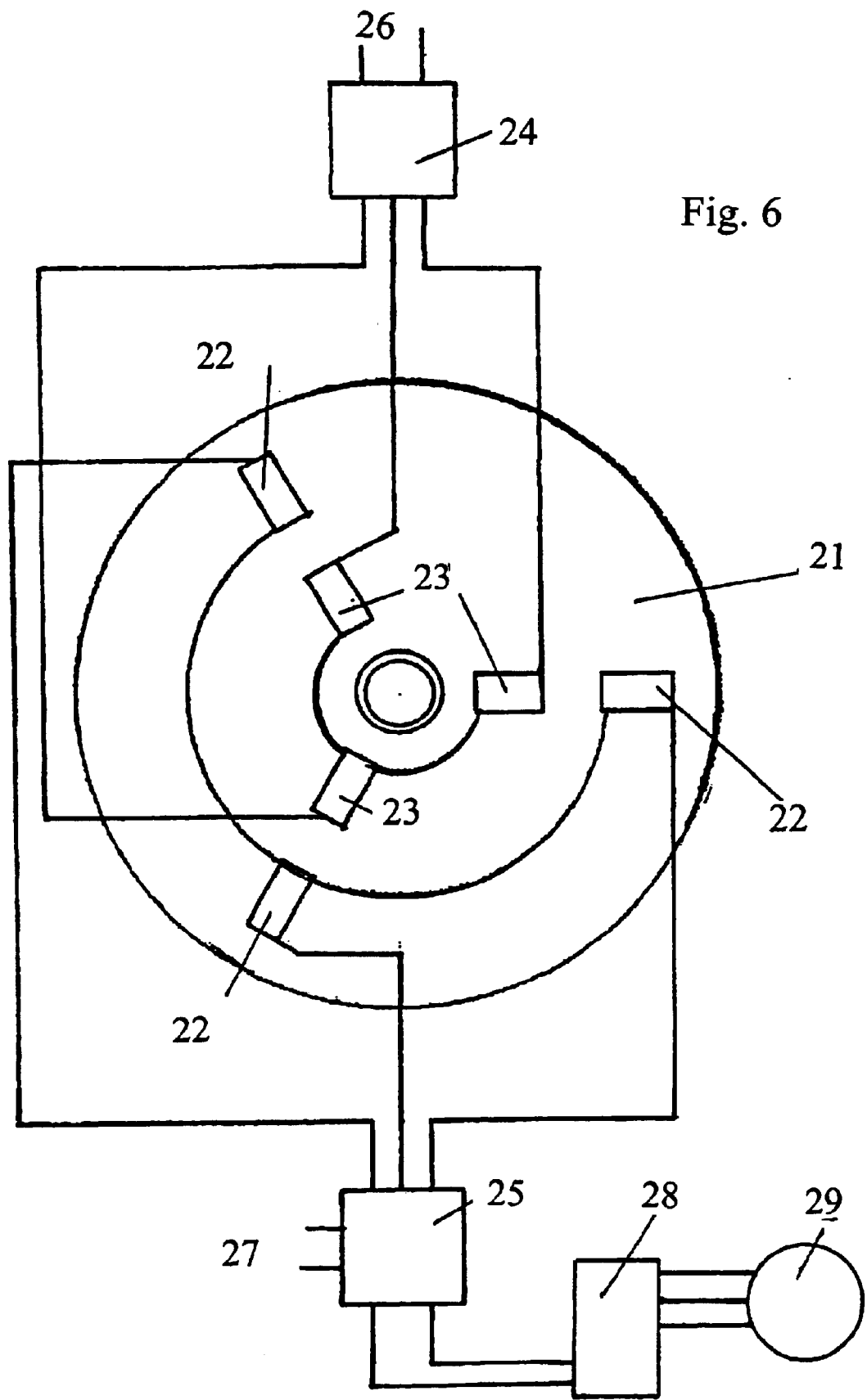
FIG. 6 shows a basic sketch of an electrical circuit of the motor.

FIG. 6 shows a three-phase electric motor, whereby this electric motor may be the first or the second electric motor. The rotor of the first electric motor is, for example, mechanically connected via a rotating shaft to the combustion engine. The rotor of the second electric motor is coupled with a rotating component, for example a turbo engine. For the exchange of electric power at a freely selectable voltage level, the first electric motor is electrically connected to the second electric motor.

The stator 21 of at least one of the two electric motors has at least two winding systems 22 and 23. The two winding systems 22, 23 are preferably galvanically separated in the electric motor and magnetically coupled with the main flux of the motor. Due to the galvanic separation, i.e. each winding system 22, 23 lies preferably in its own grooves, EMC interference from switching in one winding system 22, 23 can be suppressed.

The two winding systems 22, 23 are connected via separate electronic power circuits 24, 25 to individual power circuits which are also preferably galvanically separated. Thus, the winding system 23 can be connected via the electronic power circuit 24, for example a rectifier bridge or a transistor bridge with a direct current or battery-fed mains, preferably with the machine's mains 26, for power exchange in one or both directions. Naturally, this winding system 23 could also be operated as a motor, preferably as the starter for a combustion engine.

Via the electronic power circuit 25, a mains 27 can be supplied. Equally, this electronic power circuit 25 can also be electrically connected via the internal mains to an electronic power module 28 for the second electric motor 29.

Each winding system 22, 23 is connected, galvanically independent of the other winding system 22, 23, with electromechanical function groups on generally different voltage levels. Thus, the electromechanical function groups, e.g. an electrically operated oil pump or water pump, or an electromagnetically operated valve control for in- and output valves or motor valves, or an electrically operated ventilator can be operated independent of the power limitation of the direct current or the battery at an advantageous voltage and/or current level.

The winding systems 22, 23 can have a weak magnetic coupling, for example if the winding systems are located in different grooves, or even a close magnetic coupling, if both winding systems 22, 23 are located in one groove.

Figure 7:
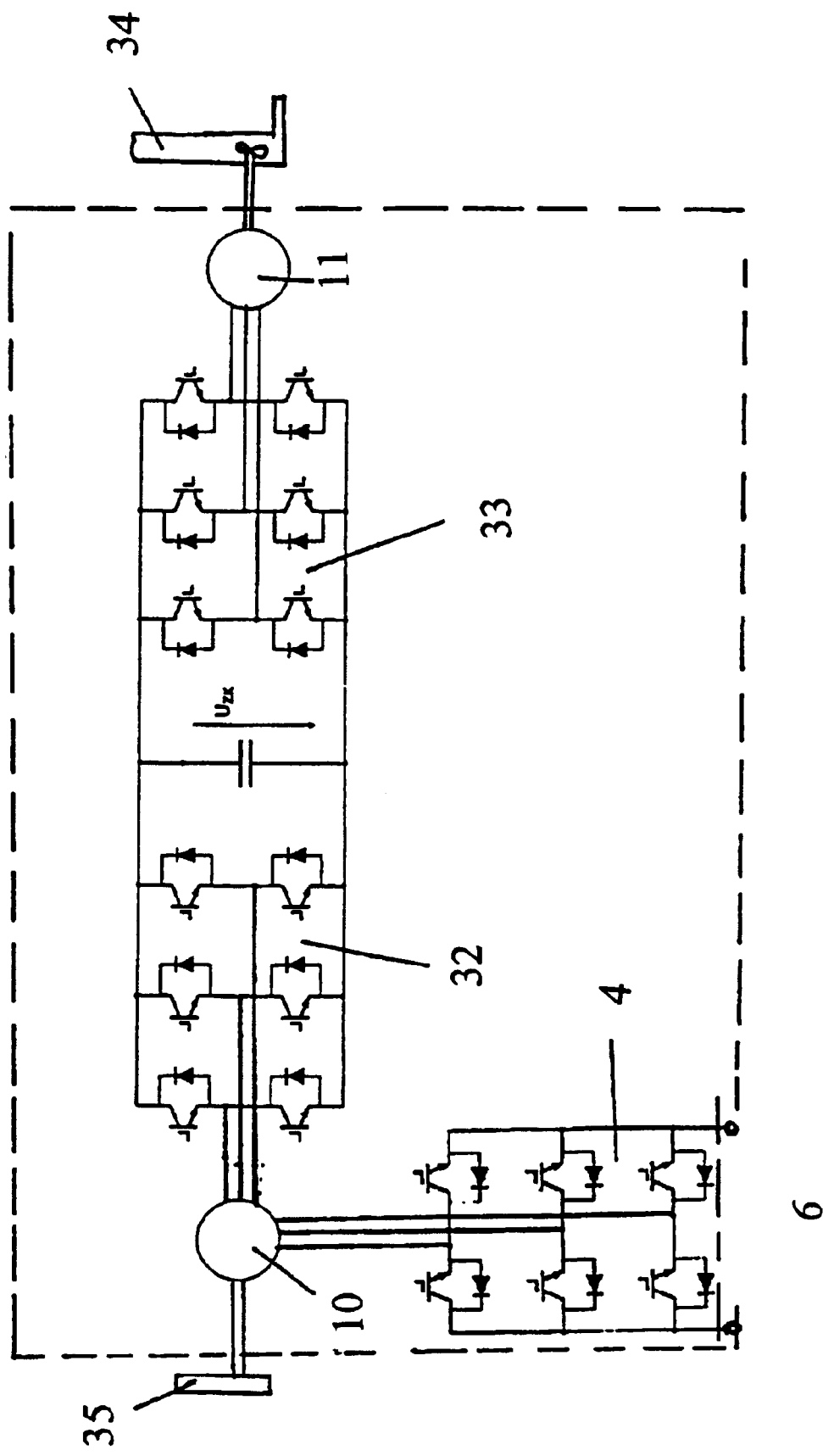
FIG. 7 shows an interconnection between a generator and a compressor engine via a converter.

FIG. 7 shows a generator, for example as the first electric motor 10, and a compressor engine as the second electric motor 11. The two electric motors are electrically connected via a generator inverter 32 and a compressor motor inverter 33. Uzk refers to the intermediate circuit voltage.

The generator is connected via its rotor to a motor, in particular a combustion engine, through a gearbox 35. The compressor motor 11 is connected via its rotor to a turbo engine 34. A winding system 22, 23 is connected via an electronic power circuit 4 to a machine's mains 6, whereby the winding systems 22, 23 can be separated galvanically.

Thereby, the first and the second electric motors can be mounted in a casing. Equally, the first and the second motors may have rotors with the same axis of rotation.

For form's sake, it is noted that for a better understanding of the invention the components are illustrated partly untrue to scale and/or are enlarged and/or made smaller.

What is claimed is:

1. An electric motor system, comprising:

at least a first electric motor comprising a first rotor and a first stator;

the first rotor being mechanically coupled to an engine;

the first motor being connected to a first control or power component;

at least a second electric motor comprising a second rotor and a second stator;

the second rotor being mechanically coupled to a mechanical aggregate;

the second motor being connected to a second control or power component;

the first and second stators being non-movably coupled to a casing;

each of the first and second control or power components being connected to each other and performing electronic power conversion;

wherein the first electric motor and the second electric motor are electrically coupled to one another and exchange electric power at a freely selectable voltage level.

2. The electric motor system of claim 1, wherein at least one of the first and second motors is of a three-phase type.

3. The electric motor system of claim 1, wherein the first rotor is mechanically coupled to the engine via at least one rotating shaft.

4. The electric motor system of claim 1, wherein the engine comprises an internal combustion engine.

5. The electric motor system of claim 4, wherein the first rotor is mechanically coupled to the internal combustion engine via at least one rotating shaft.

6. The electric motor system of claim 1, wherein the second rotor is mechanically coupled to the aggregate via a rotating part.

7. The electric motor system of claim 6, wherein the aggregate comprises at least one of a turbo-engine and a turbocharger.

8. The electric motor system of claim 1, wherein the aggregate comprises at least one of a turbo-engine and a turbocharger.

9. The electric motor system of claim 1, further comprising a gearbox, wherein the first electric motor is mechanically connected to the engine via the gearbox.

10. The electric motor system of claim 1, wherein the first electric motor is at least one of integrated with the engine and integrated with a flywheel of the engine.

11. The electric motor system of claim 1, wherein the engine comprises a flywheel and wherein the first electric motor is structurally integrated with the flywheel.

12. The electric motor system of claim 1, wherein each of the first and second motors are mounted in the casing.

13. The electric motor system of claim 1, wherein at least one of the first and second electric motors is one of an asynchronous type motor, a synchronous type motor, and a reluctance type motor.

14. The electric motor system of claim 1, wherein an axis of the first rotor is aligned with an axis of the second rotor, such that the first and second rotors of the first and second electric motors share a common axis of rotation.

15. The electric motor system of claim 1, wherein the first rotor comprises one of an inner rotor and an outer rotor.

16. The electric motor system of claim 1, wherein the second rotor comprises one of an inner rotor and an outer rotor.

17. The electric motor system of claim 1, wherein the first rotor comprises an inner rotor and the second rotor comprises an outer rotor, each rotating about a common axis.

18. The electric motor system of claim 1, wherein the first rotor comprises an inner rotor and the second rotor comprises an outer rotor.

19. The electric motor system of claim 1, further comprising a mutual stator plate system.

20. The electric motor system of claim 19, wherein the first and second stators are coupled to the mutual stator plate system, the first stator forming part of the first motor and the second stator forming part of the second motor.

21. The electric motor system of claim 19, wherein each of the first and second rotors are rotatable with respect to the mutual stator plate system.

22. The electric motor system of claim 1, wherein the casing contains at least one of the first and second motors.

23. The electric motor system of claim 1, wherein the casing surrounds at least one of the first and second motors.

24. The electric motor system of claim 1, wherein the casing houses at least one of the first and second motors, wherein the casing includes one of a cooling system and a liquid cooling system.

25. The electric motor system of claim 1, further comprising a third control or power component which supplies to an electrical main at least one of a direct current, an alternating current, and a three-phase current.

26. The electric motor system claim 1, wherein at least one of the first and second stators includes at least two winding systems.

27. The electric motor system of claim 26, wherein the at least two winding systems are galvanically separated from one another.

28. The electric motor system of claim 26, wherein the at least two winding systems are coupled magnetically with a main flux of at least one of the first and second motors.

29. The electric motor system of claim 26, wherein the at least two winding systems are connected to separate electronic power circuits.

30. The electric motor system of claim 29, wherein the separate electronic power circuits are galvanically separated from one another.

31. The electric motor system of claim 26, wherein at least one of the at least two winding systems is connected via a rectifier bridge to an electrical main and wherein the electrical main comprises at least one of a direct current supply, a battery-fed mains, and a machine's mains, whereby power can be exchanged in one direction.

32. The electric motor system of claim 26, wherein at least one of the at least two winding systems is connected via a transistor bridge to an electrical main and wherein the electrical main comprises at least one of a direct current supply, a battery-fed mains, and a machine's mains, whereby power can be exchanged in both directions.

33. The electric motor system of claim 26, wherein at least one of the first and second motors functions as a generator and as a motor.

34. The electric motor system of claim 33, wherein the generator is configured to charge an electrical main.

35. The electric motor system of claim 26, wherein at least one of the first and second motors functions as a generator and as a starter.

36. The electric motor system of claim 35, wherein the first motor functions as the generator and as the starter, and wherein the starter is mechanically coupled to the engine.

37. The electric motor system of claim 26, each of the at least two winding systems are configured to allow a galvanically separable electric power exchange to occur between circuits connected to the winding systems.

38. The electric motor system of claim 26, wherein the at least two winding systems are controlled via electronically controlled switches.

39. The electric motor system of claim 38, wherein the electronically controlled switches are configured to take over control of electric parameters from the at least two winding systems.

40. The electric motor system of claim 39, wherein the at least two winding systems are coupled to non-controllable electronic power elements.

41. The electric motor system of claim 40, wherein the non-controllable electronic power elements comprise diodes.

42. The electric motor system of claim 26, wherein each of the at least two winding systems is galvanically independent of the other winding system and is connected with electromechanical function groups on generally different voltage levels.

43. The electric motor system of claim 26, wherein the at least two winding systems are closely magnetically coupled such that an electromagnetic power exchange occurs between the at least two winding systems independent of rotor rotation according to a transformer principle.

44. The electric motor system of claim 26, wherein the at least two winding systems are weakly magnetically coupled such that a slight electromagnetic influence results on the at least two winding systems.

45. The electric motor system of claim 26, wherein a freely selectable electromagnetic power exchange can occur between the at least two winding systems and a rotor shaft connected to one of the first and second rotors.

46. The electric motor system of claim 45, wherein the freely selectable electromagnetic power exchange is adapted to occur by controlling electromagnetic parameters.

47. The electric motor system of claim 46, wherein the electromagnetic parameters comprise at least one of currents and flux linking of at least one of the at least two winding systems.

48. The electric motor system of claim 1, wherein each of the first and second electric motors are mounted in the casing.

49. The electric motor system of claim 1, wherein each of the first and second electric motors comprise one of an asynchronous motor, a synchronous motor and a reluctance motor.

50. The electric motor system of claim 1, wherein each of the first and second rotors rotate with respect to a common axis.

51. The electric motor system of claim 1, wherein the first stator comprises a first stator winding and wherein the second stator comprises a second stator winding.

52. The electric motor system of claim 51, wherein at least one of the first and second stator windings comprises a groove or air-gap winding.

53. The electric motor system of claim 1, wherein the first stator at least partially surrounds the first rotor and wherein the second rotor at least partially surrounds the second stator.

54. The electric motor system of claim 1, wherein the first rotor at least partially surrounds the first stator and wherein the second stator at least partially surrounds the second rotor.

55. The electric motor system of claim 1, further comprising at least one stator holding member, wherein the first and second stators are coupled to the at least one stator holding member and wherein the at least one stator holding member is coupled to the casing.

56. The electric motor system of claim 1, further comprising at least one circumferentially arranged stator holding member, the first stator being mounted on an outer circumferential surface of the at least one circumferentially arranged stator holding member and the second stator being mounted on an inner circumferential surface of the at least one circumferentially arranged stator holding member.

57. The electric motor system of claim 1, wherein the first and second stators are arranged to face in opposite directions relative to at least one circumferentially arranged stator holding member.

58. The electric motor system of claim 1, wherein the first rotor comprises a first axis and wherein the second rotor comprises a second axis, and wherein the first and second axes are spaced apart from one another.

59. The electric motor system of claim 1, further comprising a third control or power component connected to each of an electrical main and the first and second control or power components.

60. An electric motor system, comprising:
    at least a first electric motor comprising a first rotor and a first stator;
    the first rotor being mechanically coupled to an engine;
    at least a second electric motor comprising a second rotor and a second stator;
    the second rotor being mechanically coupled to a mechanical aggregate;
    the first stator being coupled to the second stator;
    the first and second stators being non-movably mounted to a casing; and
    an electronic power system,
    wherein the electronic power system comprises a first electronic power control circuit connected to each of an electrical main and the first stator, a second electronic power control circuit connected to each of the main and the second stator, and an electronic power module, and
    wherein the first electric motor and the second electric motor are electrically coupled to one another via the electronic power system in order to exchange electric power at a freely selectable voltage level.

61. The electric motor system of claim 60, wherein the first stator includes a winding that at least partially surrounds an outer surface of at least one circumferentially arranged stator holding member and wherein the second stator includes a winding that is at least partially surrounded by an inner surface of the at least one circumferentially arranged stator holding member.

62. The electric motor system of claim 60, wherein the first rotor comprises a first axis and wherein the second rotor comprises a second axis, and wherein the first and second axes are spaced apart from one another.

63. An electric motor system, comprising:
    a casing;
    at least a first electric motor comprising a first rotor and a first stator system;
    the first rotor being mechanically coupled to an engine;
    an electronic power circuit connected to each of the first motor and an electrical main;
    at least a second electric motor comprising a second rotor and a second stator system;
    the second rotor being mechanically coupled to a mechanical aggregate;
    a generator inverter and compressor motor inverter connecting the first and second motors to each other; and
    each of the first stator system and the second stator system being coupled to the casing, wherein the first and second stator systems are prevented from rotating relative to the casing;
    wherein the first rotor and the second rotor rotate about a common axis, and
    wherein the first electric motor and the second electric motor are electrically coupled to one another and exchange electric power at a freely selectable voltage level.

64. The electric motor system of claim 63, wherein the first and second stators comprise first and second windings, wherein at least one of the first and second windings comprises a groove or air-gap winding.

65. The electric motor system of claim 63, wherein the first stator at least partially surrounds the first rotor and wherein the second rotor at least partially surrounds the second stator.

66. The electric motor system of claim 63, further comprising at least one stator holding member, wherein the first and second stators are coupled to the at least one stator holding member.

67. The electric motor system of claim 63, further comprising first and second circumferentially arranged stator holding members, the first stator being mounted on an outer circumferential surface of the first stator holding member and the second stator being mounted on an inner circumferential surface of the second stator holding member.

68. The electric motor system of claim 63, further comprising at least one circumferentially arranged stator holding member, the first stator including a first winding that is disposed adjacent an outer circumferential surface of the at least one stator holding member and the second stator including a second winding that is disposed adjacent an inner circumferential surface of the at least one stator holding member.

69. The electric motor system of claim 63, wherein the first rotor comprises a first axis and wherein the second rotor comprises a second axis, and wherein the first and second axes are spaced apart from one another.

* * * * *